Patented July 13, 1926.

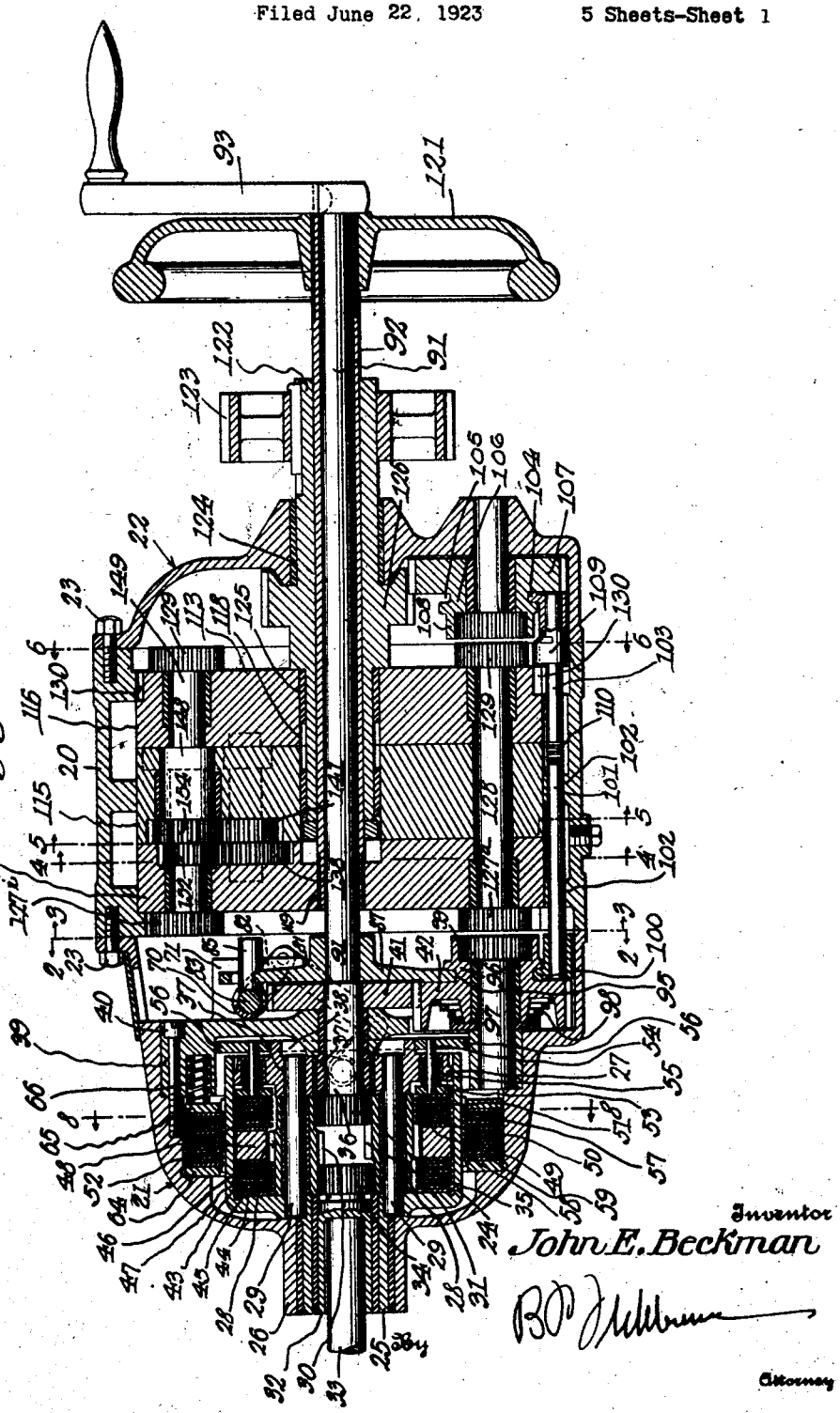

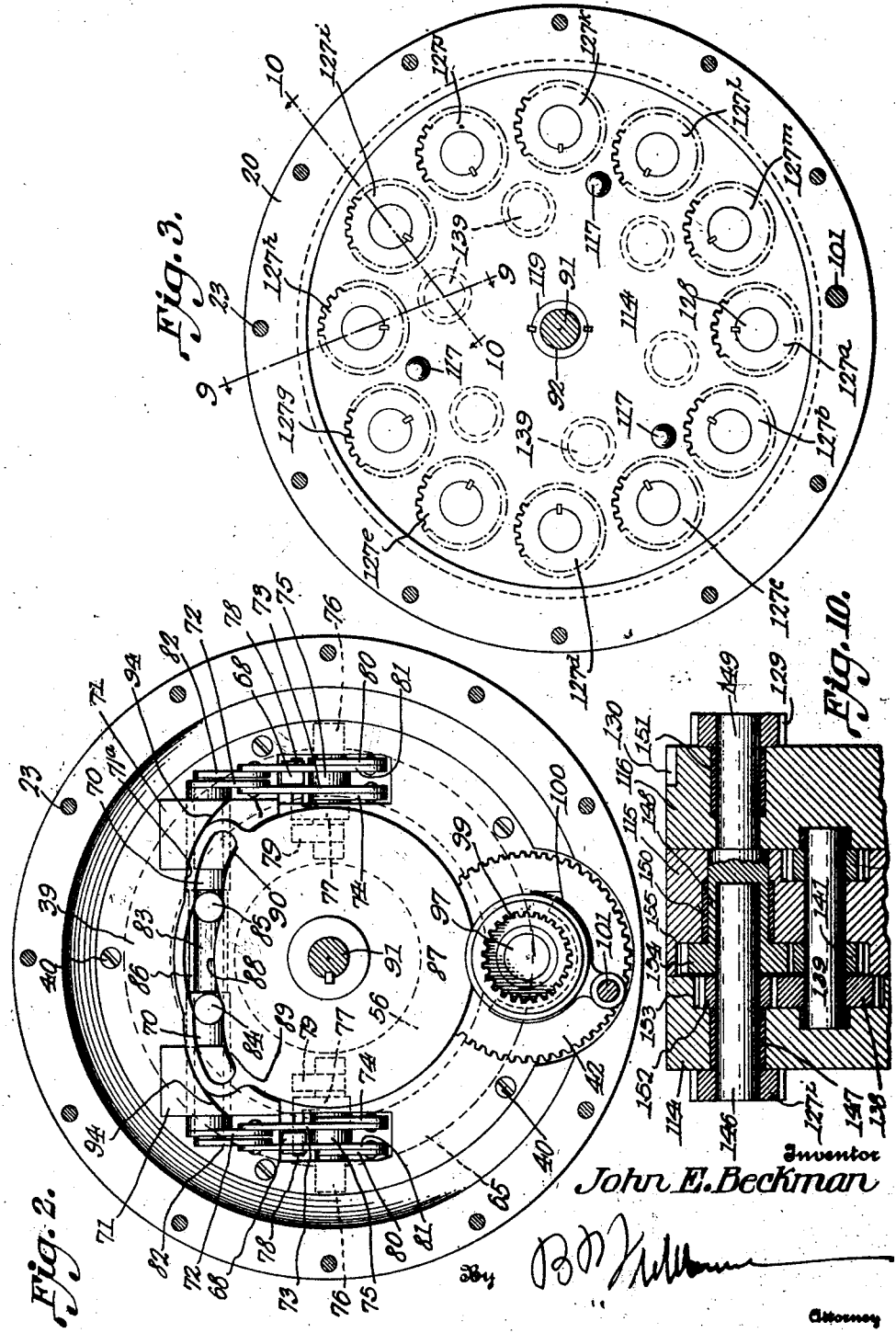

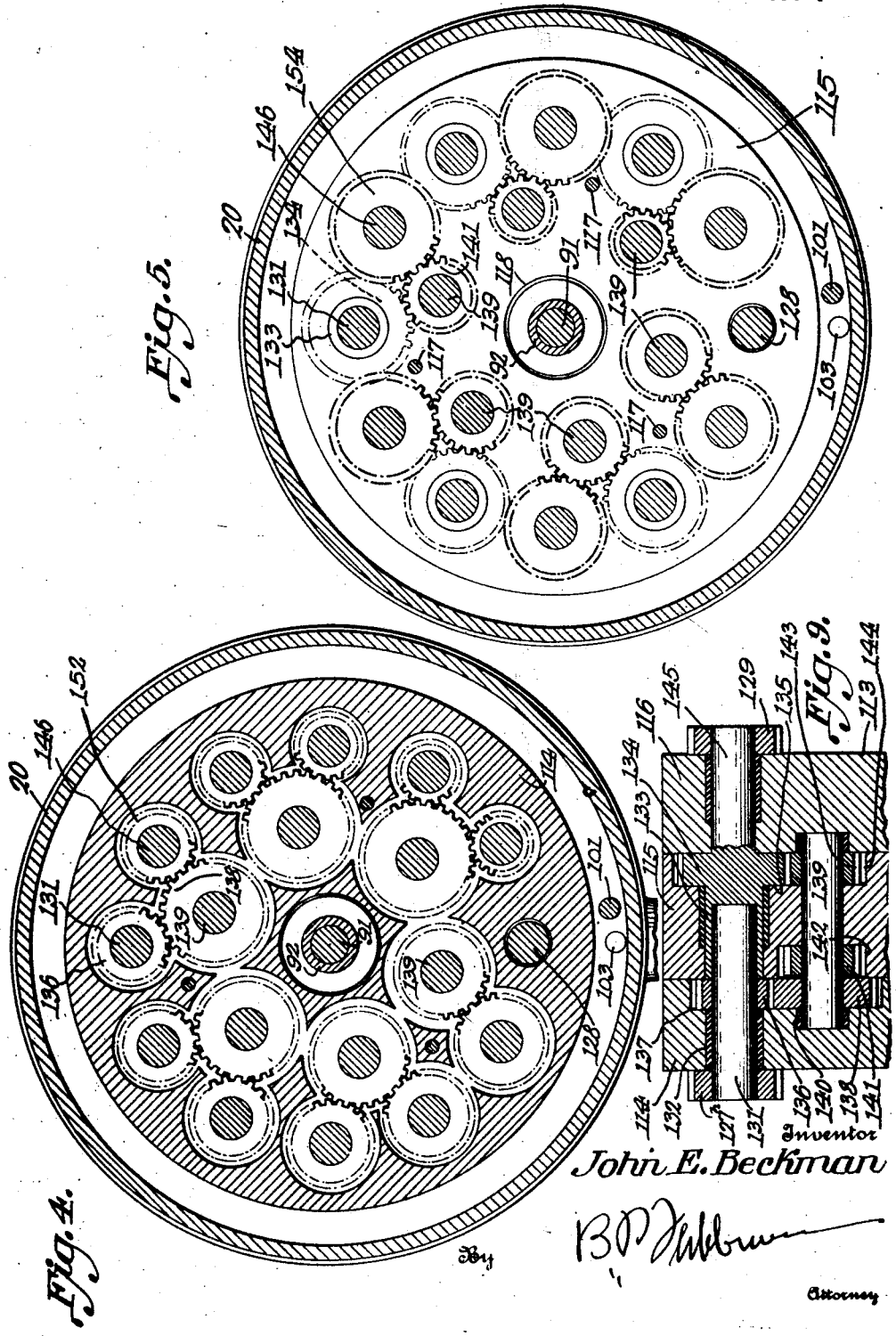

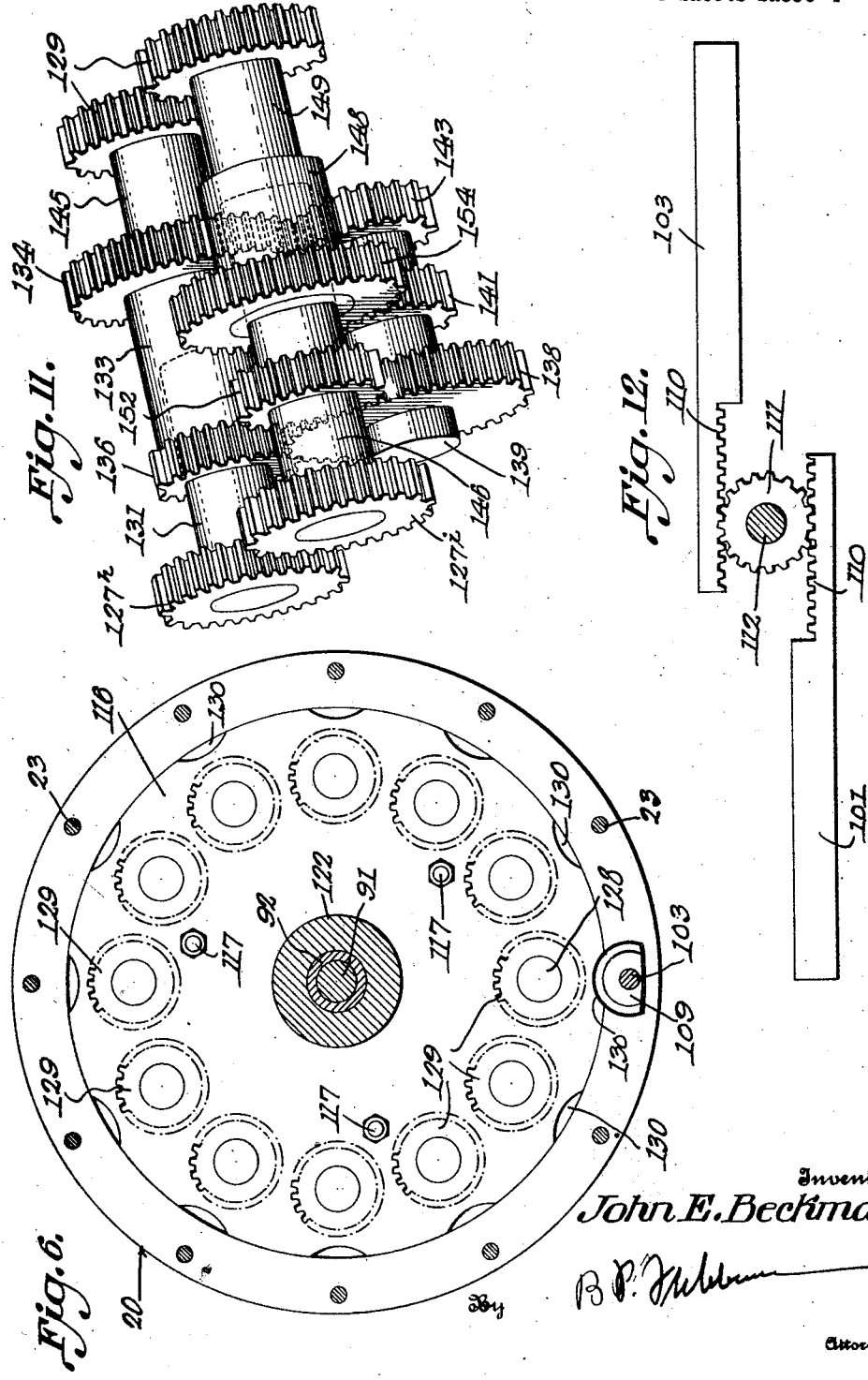

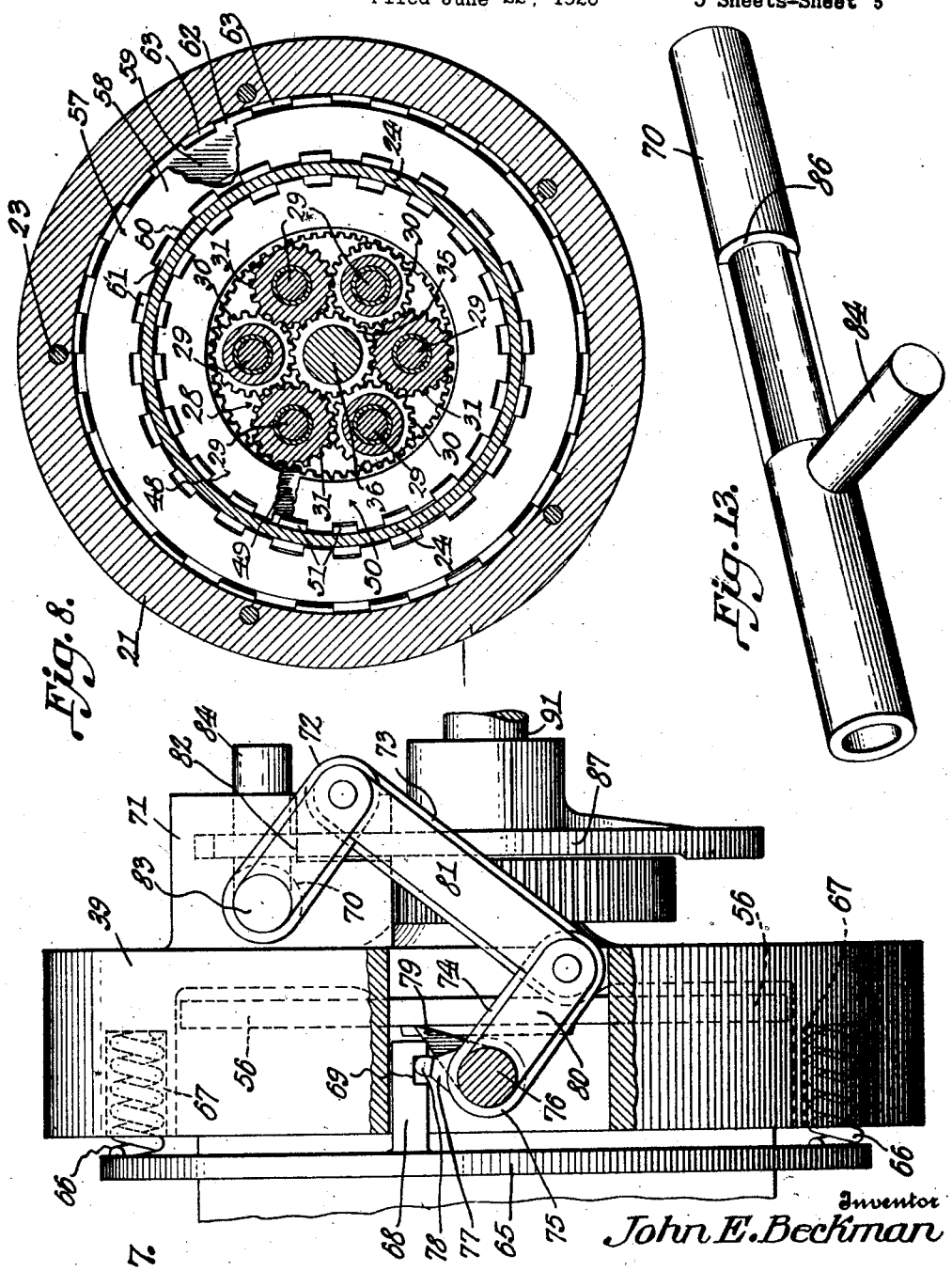

UNITED STATES PATENT OFFICE.

JOHN E. BECKMAN, OF DETROIT, MICHIGAN.

TRANSMISSION GEARING.

Application filed June 22, 1923. Serial No. 647,122.

My invention relates to improvements in gearing.

An important object of the invention is to provide means whereby the rotation from the driving element may be transmitted to a driven element, in forward or reverse directions, and at a number of selected speeds, in each direction.

A further object of the invention is to provide gearing of the above mentioned character, having a large range of speed adjustments.

A further object of the invention is to provide means for controlling the action of the friction devices, which means is securely held in the neutral position, and may be removed therefrom and manually actuated, for operating the friction devices.

A further object of the invention is to provide means for locking the change speed gearing unit against adjustment, prior to the actuation of the friction clutch devices.

A further object of the invention is to provide gearing of the above mentioned character, having the manually operated element for controlling the clutch devices, and the manually operated element for actuating the change speed unit, arranged in close relation, so that they are in convenient reach of the operator.

A further object of the invention is to provide gearing of the above mentioned character, the elements of which are arranged in a compact manner.

Other objects and advantages of the invention will be apparent during the course of the following description.

In the accompanying drawings forming a part of this specification, and in which like numerals are employed to designate like parts throughout the same, Figure 1 is a central vertical longitudinal section through gearing embodying my invention, parts being shown in elevation, Figure 2 is a transverse section taken on line 2—2 of Figure 1, looking in the direction of the arrows, Figure 3 is a similar view taken on line 3—3 of Figure 1, looking in the direction of the arrows, Figure 4 is a transverse section taken on line 4—4 of Figure 1, looking in the direction of the arrows, Figure 5 is a similar view taken on line 5—5 of Figure 1, looking in the direction of the arrows, Figure 6 is a similar view taken on line 6—6 of Figure 1, looking in the direction of the arrows, Figure 7 is a side elevation of the friction clutch actuating means, parts being broken away, Figure 8 is a transverse section taken on line 8—8 of Figure 1, looking in the direction of the arrows, Figure 9 is a detail section taken on line 9—9 of Figure 3, Figure 10 is a similar view taken on line 10—10 of Figure 3, Figure 11 is a perspective view of a set of speed reducing gears constituting a unit, Figure 12 is a plan view of a pair of operating rods and gears associated therewith, and, Figure 13 is a perspective view of a tubular rock shaft.

In the drawings, wherein for the purpose of illustration is shown a preferred embodiment of my invention, the numeral 20 designates a central casing, which is adapted to be held stationary by any suitable means, as by being bolted to a suitable foundation. This central casing section carries end casing sections 21 and 22, which may be bolted to the same, as shown at 23.

The numeral 24 designates a rotatable gear-carrier, having a tubular shank 25, rotatable within a sleeve 26, integral with the end casing 21, as shown. This gear-carrier 24 is hollow and is in the form of a shell, and a head 27 is suitably rigidly mounted within the forward end of this shell, preferably in a manner to permit of the removal of the head, when desired. This mounting may be effected by forming L-shaped grooves in the outer portion of the shell 24 for receiving lugs or keys formed upon the head 27, which are shifted into the transverse portions of the L-shaped grooves, and the head clamped against rotation by screws or the like. The numeral 28 designates combination planetary gears. I have shown six of these combination gears, Figure 8, but of course the number may be varied, as found advantageous. The numeral 29 designates shafts, upon which the combination gears are rotatable, and these shafts are carried within openings formed in the end of the shell 24 and in the head 27. The gears 28 are divided into two sets, with three of the gears in each set. One set of gears 28 is provided with gear teeth 30, extending from the center thereof to the forward ends of the same, while the other set of gears have gear teeth 31 which extend from the center of the same to the rear ends. The intermediate portions of these gear teeth are in permanent mesh, as clearly shown in Figure 8, and hence all of these combination gears simultaneously rotate, but alternate gears rotate in opposite directions. The rear ends of the alternate gears in the first set are smooth or have no gear teeth while the forward ends of the alternate gears on the other set are smooth or have no teeth.

The numeral 32 designates a cylindrical tubular coupling, which is rotatable within the tubular shank 25 and is preferably removable therefrom. This tubular coupling is adapted for the reception of a driving shaft 33, which may be keyed therein. This driving shaft may receive its rotation from any suitable form of prime mover, such as an electric motor, internal combustion engine, or the like. The rear end of the coupling 32 has a gear 34 rigidly secured thereto, which gear is in mesh with the forward toothed ends of one set of the combination gears, and free from engagement with the other set having their forward ends without teeth. The numeral 35 designates a driven gear, arranged concentrically within the carrier 24, and in permanent mesh with the other set of gears 28 having teeth upon their rear ends, free from engagement with the set of gears 28 having their rear ends without teeth. The gear 35 is rigidly mounted upon a shaft 36, extending through a bearing 37', which bearing is held within openings 38 formed in the head 27 and in a head 39, which is bolted to the rearward face of the end casing 21, as shown at 40. The shaft 36 has a gear 41 rigidly secured thereto, engaging and driving a gear 42, for a purpose to be described.

The numeral 43 designates an annular friction clutch device as a whole, embodying alternately arranged friction rings 44 and 45. This annular friction clutch device is mounted in the forward end of the carrier 24. The set of rings 44 project inwardly radially beyond the other set of rings 45 and are provided upon their inner edges with gear teeth, which are in permanent mesh with the gear teeth 30 upon one set of the combination gears 28. The rings have no gear teeth upon their outer edges. The other set of rings 45 have no gear teeth at their inner edges and do not engage with the gear teeth of the combination gears. This second set of rings is provided with outer teeth 46, which slidably interfit with longitudinal teeth or ribs 47, formed upon the inner side of the carrier 24. The first set of rings have no teeth at their outer edges and hence do not engage with the carrier 24. The numeral 48 designates a second annular friction clutch device, embodying alternate rings 49, and 50. The rings 49 project inwardly beyond the rings 50 and have gear teeth engaging with the gear teeth 31 at the rear end of one set of combination gears 28, while the other set of rings 50 are free from teeth at their inner edges and hence have no such engagement. The set of rings 50 project radially outwardly beyond the first set and are provided at their outer edges with teeth, interfitting with teeth or ribs 51, formed upon the inner side of the carrier. The rings 49 have their outer edges smooth and each slide upon the ribs 5, and the rings 50 have their inner edges smooth. A filler ring 52 is arranged between the two annular friction clutch elements, as shown.

The numeral 53 designates a ring, engaging the rear end of the rear annular clutch device 48, and carrying pins 54, rigidly secured thereto. These pins are slidable through openings in the head 27 and the ring 53 is urged forwardly by means of stiff coil springs 55. The outer or rear ends of these pins 55 are connected with a lift ring 56, as shown. When this lift ring is moved rearwardly, the springs 55 are compressed and the two annular clutch devices are rendered idle. The means for shifting the lift ring 56 rearwardly will be described hereinafter.

The numeral 57 designates an outer annular friction clutch device, mounted in the end casing 21, and embodying alternate sets of friction rings 58 and 59. The rings 58 are provided at their inner edges with teeth 60 to engage between the teeth or ribs 61 formed upon the periphery of the carrier 24, while the rings 59 project radially at their outer edges beyond the rings 58 and carry teeth 62, engaging between teeth 63, formed upon the inner side of the end casing 21. One set of rings 58 is therefore keyed to the periphery of the carrier 24 while the other set is keyed to the inner surface of the end casing 21, and when these two sets of rings have proper frictional engagement, they will function to lock the carrier 24 against rotation. At one end, the sets of friction rings engage a stationary stop ring 64, while at the other end, they engage a lift ring 65, urged forwardly by compressible coil springs 66, held within pockets 67 in the head 39. The lifting ring 65, see more particularly Figure 7, is provided with rearwardly projecting fingers 68 having notches 69 formed therein, as shown. Attention being called now more particularly to Figures 1, 2, 7 and 13, the numeral 70 designates a tubular rock shaft, which is pivotally mounted within openings formed in lugs 71, which are preferably cast integral with the head 39. The tubular rock shaft is provided at its ends with cranks 72, see Figures 2 and 7, particularly, which cranks extend rearwardly and downwardly and have pivotal connection with links 73. These links are pivotally connected with angularly arranged cranks 74, which are rigidly mounted upon sleeves 75. These sleeves are pivotally mounted upon stub shafts 76, suitably journaled in the head 39. The sleeves 75 are diametrically oppositely arranged and have cam elements 77 rigidly secured to their inner ends, and projecting upwardly. These cam elements have outwardly extending lateral projections 78, fitting into the notches 69 of the arms 68. When the cam elelements 77 are swung rearwardly, they compress the springs 66 and shift the lift ring 65 rearwardly. The stub shafts 76 carry cams 79, which engage the forward face of the lift ring 56, and when these cams are swung rearwardly they move the lift ring rearwardly with them. The cams 79 are rigid upon the stub shafts 76 and the stub shafts are turned by cranks 80, having pivotal connection with links 81, extending upwardly for pivotal connection with cranks 82, which are rigidly mounted upon a rock shaft 83. This rock shaft is pivotally supported within the tubular rock shaft 70, as shown. The tubular rock shaft 70 and the rock shaft 83 are adapted to be turned independently of each other, as will be described. The tubular rock shaft 70 carries a rearwardly projecting radial pin 84, rigidly secured thereto and a rearwardly extending radial pin 85 is rigidly mounted upon the rock shaft 83, and is adapted to partake of swinging movement within an opening 86, formed in the tubular rock shaft 70. The control pins 84 and 85 engage the periphery of an operating cam 87. This cam has a concentric face 88 and eccentric outwardly bulging faces 89 and 90. When the cam is in the neutral position, both control pins 84 and 85 are in the neutral position and engage the concentric face 88, at the ends thereof and when in this position these pins and associated elements retain the lift rings 56 and 65 in the rear retracted positions, whereby the inner and outer annular clutch devices are rendered inactive. When the cam 87 is turned in one direction, for instance to the left in Figure 2, the pin 85 will ride upon the cam face 90 and be shifted outwardly while the pin 84 will not move radially as it will ride upon the concentric face 88. As the pin 85 moves outwardly, the cam 79 is allowed to move forwardly, and hence the springs render the inner annular clutch devices active while the outer annular clutch device remains inactive.

The operating cam 87 is rigidly mounted upon the rear end of a longitudinally extending shaft 91, which is rotatably mounted within a tubular shaft 92. The shaft 91 is provided at its rear end with a crank 93 for turning it. The operating cam 87 has its upper edge 71ª adapted for arrangement within cam faces 94, formed in the lugs 71, and it is obvious that the operating cam 87 cannot be turned until it is moved rearwardly to clear the lugs 71. This is accomplished by moving the shaft or rod 91 rearwardly a suitable distance, subsequent to which the cam may be turned by turning the rod 91. The turning movement of the cam 87 is obviously limited.

The lower edge of the cam 87 engages within an annular groove 95, formed upon a hub 96, of the gear 42. This gear has sufficient thickness whereby it remains in permanent mesh with the gear 41, as this gear 42 is shifted longitudinally upon the shaft 97, upon which it is slidably mounted. This shaft is suitably anchored in the casing 21. The cam 87 therefore serves as a shifting element for the gear 42. A compressible coil spring 98 is preferably employed to aid in shifting the gear 42 rearwardly. The gear 42 is provided at its rear end with a female clutch element 99, preferably integral therewith, for coaction with a plurality of male clutch elements, to be described.

The annular groove of the hub 96 slidably receives a shifting fork 100, rigidly mounted upon a reciprocating rod 101, see more particularly Figures 1 and 12, which is guided by apertured lugs 102. The numeral 103 designates a coacting reciprocating bar or rod, guided within suitable lugs, and provided at its rear end with a shifting element or fork 104, engaging within an annular groove 105, formed in the hub 106 of a gear 107. The hub 106 carries a female clutch element 108, as shown. The fork 104 also has a locking bolt or lug 109, rigidly secured to its rear end, for a purpose to be described. As more clearly shown in Figure 12, the rods 101 and 103 are provided with toothed portions 110, between which is arranged a gear 111, pivoted upon a suitably supported shaft 112. It is thus seen that this gear and racks cause the rods 101 and 103 to move simultaneously in opposite directions.

The numeral 113 designates a cylindrical change speed gear-carrier, which is preferably formed in a plurality of sections, such as three sections 114, 115, and 116. These sections are rigidly secured together by bolts 117 or the like, as more clearly illustrated in Figure 3. The carrier 113 is bodily rotatable within the central casing 20 and has a central cylindrical opening 118, and a contracted opening 119. The tubular shaft 92 is rotatable upon the shaft 91 and extending into the casing 20 is keyed within the opening 119, so that the carrier 113 is rigidly secured to this tubular shaft, for rotation therewith. The shaft 92 has a hand-wheel 121 keyed to its outer end, in proximity to the handle 93, for turning the same. The numeral 122 designates a rotatable tubular driven shaft, mounted upon the tubular shaft 92 and having a driven gear 123 rigidly mounted upon its rear end. The tubular shaft 122 is journaled in a bearing 124, formed in the rear end casing 22. The tubular shaft 122 extends into the opening 118, and is rotatable within bearings 125 held within the opening 118. The tubular shaft 122 has a gear 126 preferably formed integral therewith, which is of sufficient thickness to remain in permanent mesh with the shifting gear 107.

The carrier 113 supports a plurality of different ratio gearing devices, which are adapted to be selected and operatively connected with the clutch 99, whereby each gear device will transmit the rotation of the gear 42 to the gear 107. It may be assumed that the change speed devices start with a change speed device of the maximum speed and decrease from the same, although the invention is in no sense restricted to this particular arrangement.

In carrying out this idea, the numerals $127^a$, $127^b$, $127^c$, $127^d$, $127^e$, $127^f$, $127^g$, $127^h$, $127^i$, $127^j$, $127^k$, $127^l$, $127^m$, designate a plurality of male clutch elements, for coaction with the female clutch element 99. These male clutch elements are arranged in an annular group upon the forward face of the carrier 113, and each of the same is adapted to be selected by the turning of the wheel 121 and brought into alinement with the female clutch element 99, which is subsequently moved rearwardly for the reception of the same, when the shaft 91 is moved rearwardly, as explained. The clutch element $127^a$ at the bottom, Figure 3, is included in the gear device of the maximum speed, and is rigidly mounted upon the forward end of a shaft 128, journaled within openings formed in the sections of the carrier 113, and having one of the male clutch elements 129 rigidly secured to its rear end. This male clutch element is adapted for coaction with the female clutch element 108. The clutch elements 129, Figure 6, are arranged in an annular group upon the rear side of the carrier, and correspond in number and arrangement to the clutch elements $127^a$, to $127^m$. As clearly shown in Figure 6, the carrier section 116 is provided at its periphery with recesses or notches 130, disposed in an annular group and corresponding in number and arrangement to the clutch elements 129. When a selected clutch element 129 is in alinement with the clutch element 106, the corresponding notch 130 is in alinement with the bolt 109, and as the clutch element 129 engages within the clutch element 106, the bolt 109 simultaneously enters the notch 130, thereby locking the carrier 113 against rotation.

Secured to each forward male clutch element, such as $127^h$ is a stub shaft 131, Figure 9, which is journaled in a bearing 132, and also in the tubular hub 133 of a gear 134, arranged within a recess 135 formed in the rear face of the section 115. The shaft carries a gear 136 rigidly secured thereto, and arranged in a recess 137 in the rear face of the section 114. This gear 136 engages a larger gear 138, also mounted in the recess 137 and rigidly mounted upon a stub shaft 139, journaled in bearings 140. The shaft 139 carries a smaller gear 141, arranged in a recess 142, which is rigidly secured thereto. A gear 143 is rigidly mounted upon the rear end of the stub shaft 139 and operates within a recess 144 and engages the gear 134. The gear 143 is of smaller diameter than the gear 134, and hence the shaft 131 driving through gears 136, 138, shaft 139, gear 143, and gear 134 to the shaft 145, has its speed of rotation reduced. The shaft 145 carries the corresponding clutch element 129. By reference to Figure 10 it will be seen that the next clutch element $127^i$ is rigidly mounted upon a stub shaft 146, journaled in a bearing 147. The rear end of this stub shaft is journaled in a tubular hub 148 integral with a stub shaft 149. The tubular hub 148 is journaled in a bearing 150 and the shaft 149 is journaled in a bearing 151. The clutch element 129 is rigidly secured to the rear end of the shaft 149. The shaft 146 has a small gear 152 rigidly mounted thereon, operating within recess 153. This small gear 152 is in permanent mesh with the larger gear 138. The smaller gear 141, rigidly secured to the shaft 139 is in permanent mesh with a larger gear 154, operating within a recess 155. This larger gear is integral with the tubular hub 148. It is thus seen that when the clutch element $127^i$ is driven, its rotation will be reduced and transmitted to the corresponding clutch element 129. It is thus seen that the clutch elements $127^h$ and $127^i$ constitute a pair and the shaft 139 is common to this pair of clutch elements. The other clutch elements are arranged in pairs, and the gearing between the same and the corresponding rear clutch elements is identical with that described in connection with the clutch elements $127^h$ and $127^i$, and need not be given again, excepting to state that the ratio of the gears are suitably changed, to properly reduce the speeds of rotation from the forward clutch element to the rear clutch element, starting with clutch element $127^a$. This gearing is identical throughout the several pairs of clutch elements excepting in the pair of clutch elements $127^a$ and $127^b$. As previously described, the shaft 128 is continuous throughout, and affords a direct drive. The gearing between the clutch element $127^b$ and its corresponding rear clutch element 129 is identical to that described in connection with the clutch element 127ʰ, but of a different gear ratio, the only difference being that the shaft 128 is not geared to the stub shaft 139, as is obvious.

In the operation of the gearing, when the cam 87 is in the neutral position, Figure 2, the pins or cranks 84 and 85 engage the concentric face 88 of the cam, and the pair of inner clutch devices 44 and 48 are inactive and the outer annular clutch device 57 is inactive, that is the rings of these clutch devices are free to slip. This being the case, the carrier 24 will rotate, and the gears 28 are free to turn upon their axes, and rotation will not be imparted to the gear 35. When it is desired to impart rotation to the gear 123, the operator turns the hand wheel 121 to select the desired speed. When this is done, the selected male clutch element, such as 127ª is in alinement with the clutch element 99, and the clutch element 108 is in alinement with the clutch element 129. Before the cam 41 can be turned, in either direction, it is shifted rearwardly, by the operator moving the handle 93 rearwardly. When this occurs, the clutch element 99 receives the clutch element 127ª and the clutch element 129 enters the clutch element 108, and simultaneously with this action, the bolt 109 enters the notch 130, whereby the carrier 114 is locked against turning movement. The cam 87 being moved rearwardly sufficiently to clear the lugs 71, this cam may now be turned in either direction. Assuming that the shaft 91 is turned in a direction to turn the cam 87, clock-wise, in Figure 2, then the crank or pin 85 will slide upon the concentric face 88, while the pin 84 will be shifted outwardly by engaging the cam face 89. The pin 85 is carried by the rock shaft 83, and hence this rock shaft does not turn and the cranks 82 and associated elements connected therewith do not move. The cams 79 hence retain the lift ring 56 in the rear position and the inner annular clutch devices 43 and 48 remain inactive or idle. Simultaneously with this action, the lift ring 65 moves forwardly, when the tubular rock shaft 70 turns upon the outward movement of the crank 84, and the outer annular clutch device 57 now functions to hold the carrier 24 against rotation. As the carrier cannot now rotate, the combination gears 28 turn upon their longitudinal axes and the rotation is transmitted in a reverse direction, from the gear 34 to the gear 35, which rotation is transmitted through the speed changing means to the gear 123, as is obvious. If it should be desired to have the gearing operate in a forward direction, the cam 87 is turned counter-clockwise, in Figure 2, and after the cam passes the neutral position, crank 84 remains stationary, while the crank 85 moves outwardly upon the cam face 90. This serves to move the lift ring 56 forwardly, rendering the clutch devices 43 and 48 active, whereby the combination gears 24 cannot turn upon their longitudinal axes, and simultaneously holding the lift ring 65 against forward movement, whereby the clutch device 57 remains inactive. It will be seen that the combination gears 29 and the carrier 24 and associated elements now rotate as a unit and the rotation of the shaft 23 is transmitted to the gear 35, in a forwardly direction.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, what I claim is:

1. In transmission gearing, a rotatable carrier, a plurality of planetary gears mounted upon the carrier and in permanent mesh with each other, alternate planetary gears having their opposite ends free from teeth, a driving gear surrounded by the planetary gears and engaging the teeth at the end portions of one set of the planetary gears, a driven gear surrounded by the planetary gears and engaging the teeth at the end portions of the other set of planetary gears, friction clutch means having gear teeth engaging with the teeth at the end portions of the sets of planetary gears, means for rendering the clutch means active and inactive, a clutch device for controlling the rotation of the carrier, and means to render the clutch device active and inactive.

2. In transmission gearing, a rotatable carrier, a plurality of planetary gears mounted upon the carrier in permanent mesh with each other, alternate planetary gears having their opposite ends free from gear teeth, a driving gear surrounded by the planetary gears and engaging the gear teeth at the end portions of one set of the planetary gears, a driven gear surrounded by the planetary gears and engaging the gear teeth at the end portions of the other set of planetary gears, friction clutch means having gear teeth engaging with the gear teeth at the end portions of the sets of planetary gears, a friction clutch device for controlling the rotation of the carrier, and common means to render the friction clutch means active and retain the friction clutch device inactive.

3. In transmission gearing; a rotatable carrier; a plurality of planetary gears mounted upon the carrier with their intermediate portions in permanent mesh with each other, alternate planetary gears having their opposite ends free from gear teeth;

a driving gear surrounded by the planetary gears and engaging the gear teeth at the end portions of one set of the planetary gears; a driven gear surrounded by the planetary gears and engaging the gear teeth at the end portions of the other set of planetary gears; an inner friction clutch device disposed within the carrier near one end of the planetary gears, said device embodying a set of friction rings having gear teeth upon their inner edges for engaging the gear teeth at the end portions of one set of the planetary gears, and an alternate set of friction rings keyed at their outer edges to the carrier to slide longitudinally thereof; a second inner friction clutch device disposed within the carrier near one end of the planetary gears, said device embodying a set of friction rings having gear teeth upon their inner edges for engaging the gear teeth at the end portions of the other set of the planetary gears, and an intermediate set of friction rings keyed at their outer edges to the carrier to slide longitudinally thereof; an outer friction clutch device surrounding the carrier, said device embodying a set of friction rings keyed at their inner edges to the outer surface of the carrier to move longitudinally thereof, and an alternate set of friction rings keyed at their outer edges to a stationary casing; and means to render both inner friction devices active while maintaining the outer friction device inactive and for rendering the outer friction device active while maintaining both inner friction devices inactive.

4. In a transmission gearing, a rotatable carrier, a plurality of planetary gears mounted upon the carrier with their intermediate portions in permanent mesh with each other, alternate planetary gears having their opposite ends free from gear teeth, a driving gear surrounded by the planetary gears and engaging the gear teeth at the end portions of one set of the planetary gears, a driven gear surrounded by the planetary gears and engaging the gear teeth at the end portions of the other set of planetary gears, friction clutch means mounted within the carrier and having gear teeth engaging with the gear teeth at the end portions of the sets of planetary gears, a friction clutch device for controlling the rotation of the carrier, resilient means adapted when released to render the friction clutch means active, separate resilient means adapted when released to render the friction clutch device active, a shifting element having operative connection with the first named resilient means, a second shifting element having operative connection with the second named resilient means, and a cam having a concentric face for engaging with the shifting elements and cam faces at the outer ends of the concentric face, and means to turn the cam.

5. In transmission gearing, a rotatable carrier, a plurality of planetary gears mounted upon the carrier with their intermediate portions in permanent mesh, alternate planetary gears having their opposite ends free from gear teeth, a driving gear engaging the gear teeth at the end portions of one set of the planetary gears, a driven gear engaging the gear teeth at the end portions of the other set of planetary gears, clutch means having gear teeth engaging with the gear teeth at the end portions of the sets of planetary gears, a friction clutch device for controlling the rotation of the carrier, resilient means adapted when released to render the friction clutch means active, a second resilient means adapted when released to render the friction clutch device active, a shifting element having operative connection with the first named resilient means, a second shifting element having operative connection with the second named resilient means, a cam having a concentric face to engage with the shifting elements and eccentric faces at the ends of the concentric face, a pair of relatively stationary stop lugs arranged near the cam and having recesses formed therein for receiving portions of the cam to prevent rotation of the same, and means connected with the cam to shift it longitudinally for clearing the lugs and subsequently turning the cam.

6. In transmission gearing, a rotatable carrier, a plurality of planetary gears mounted upon the carrier in permanent mesh with each other, alternate planetary gears having their opposite end portions free from gear teeth, a driving gear engaging the gear teeth at the end portions of one set of the planetary gears, a driven gear engaging the gear teeth at the end portions of the other set of planetry gears, friction clutch means for controlling the rotation of the planetary gears upon their axes, a friction clutch device for controlling the rotation of the carrier, means for rendering the friction clutch means active including a shifting element, means for rendering the friction clutch device active including a shifting element, a cam having a concentric face and eccentric faces at the ends of the concentric face, said shifting elements being arranged to engage with said faces, means to normally hold the cam in the neutral position against turning movement, and means for shifting the cam longitudinally out of engagement with the holding means and then turning the cam.

7. In transmission gearing, a rotatable carrier, alternate planetary gear elements arranged in sets secured to the rotatable carrier, the alternate gear elements having portions thereof in permanent mesh, the gear elements in one set having gear portions disposed to one side of the permanently meshing portions, a driving gear engaging one of said gear portions, the gear elements in the other set having gear portions disposed to one side of said permanently meshing portions, a driven gear engaging one gear portion of the last named set of gear elements, friction clutch means having gear teeth engaging the ear portions of the said sets, means to render the friction clutch means active and inactive, a clutch device for controlling the rotation of the carrier, and means to render the clutch device active and inactive.

8. In transmission gearing, a rotatable carrier, alternate planetary gear elements arranged in sets secured to the rotatable carrier, the gear elements in one set having gear portions, the gear elements in the other set having separate gear portions, a rotatable gear engaging the first named gear portions, a second rotatable gear engaging the second named gear portions, friction clutch means having gear teeth engaging the gear portions of both sets, means to render the friction clutch means active and inactive, and means for controlling the rotation of the carrier.

In testimony whereof I affix my signature.

JOHN E. BECKMAN.